Nov. 4, 1969  R. L. KASTER  3,476,143
PIVOTING DISC HEART VALVE
Filed April 17, 1967  3 Sheets-Sheet 2
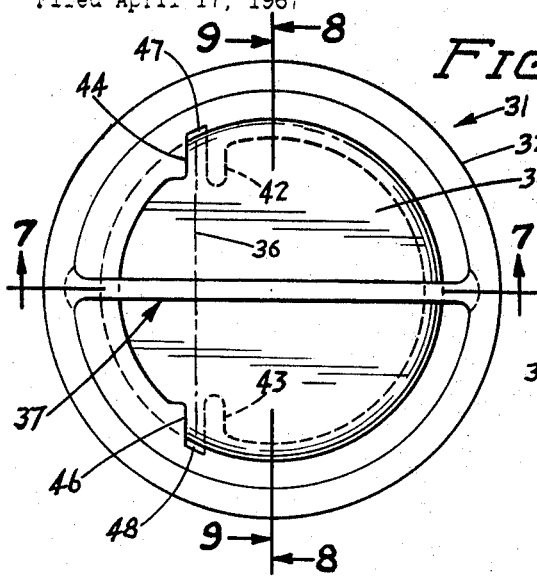
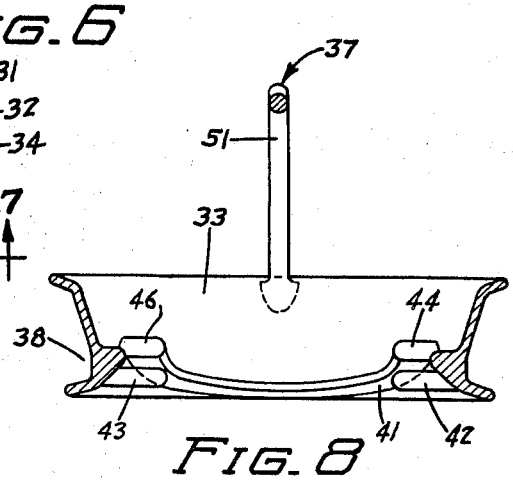
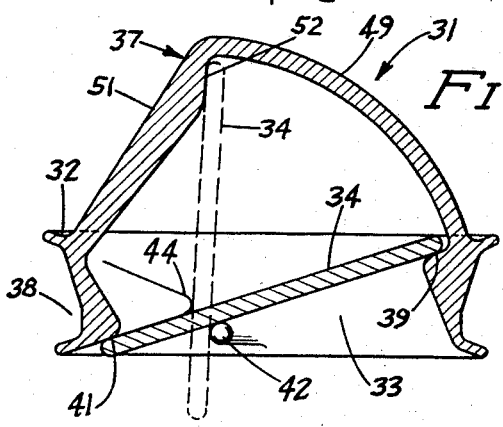
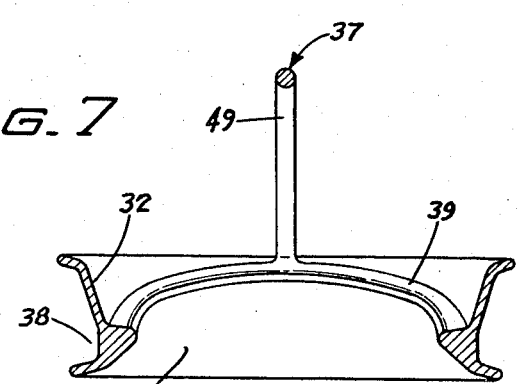
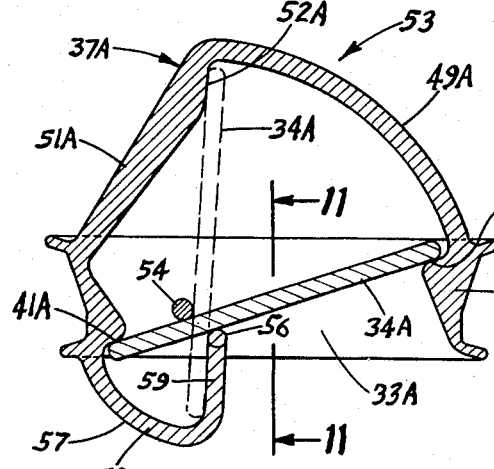
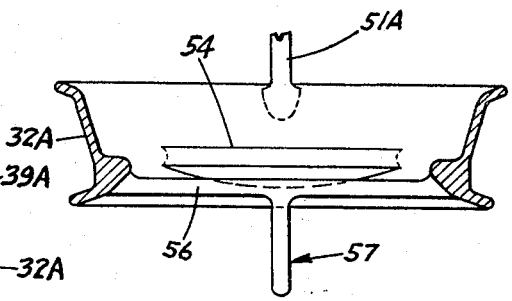
INVENTOR.
ROBERT L. KASTER
BY
Burd, MacEachron, Braddock,
Bartz & Schwartz
ATTORNEYS Nov. 4, 1969 R. L. KASTER 3,476,143
PIVOTING DISC HEART VALVE
Filed April 17, 1967 3 Sheets-Sheet 3

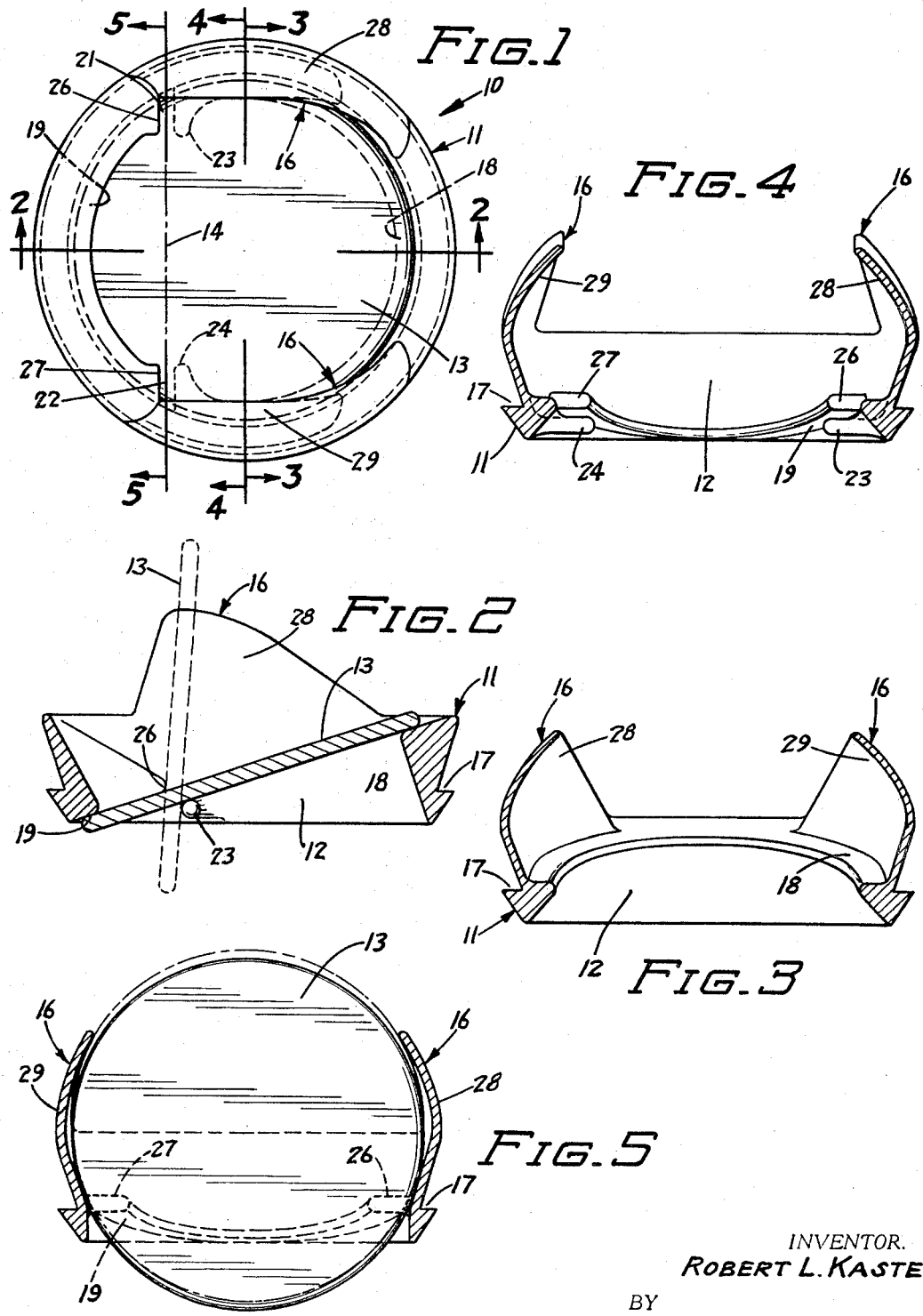

INVENTOR.
ROBERT L. KASTER
BY
Burd, MacEachron, Braddock,
Bartz & Schwartz
ATTORNEYS United States Patent Office 3,476,143
Patented Nov. 4, 1969

3,476,143
PIVOTING DISC HEART VALVE
Robert L. Kaster, Minneapolis, Minn., assignor to The Regents of the University of Minnesota, Minneapolis, Minn., a corporation of Minnesota
Filed Apr. 17, 1967, Ser. No. 631,322
Int. Cl. A16k 17/12; A61f 1/22
U.S. Cl. 137—527.8                                21 Claims

ABSTRACT OF THE DISCLOSURE

A one-way mechanical heart valve comprising a base having a passage allowing liquid to flow through the valve. A disc located within the passage pivots about a chordal axis to an open position and a closed position relative to a seat on the inside of the base. In one form the seat includes an inclined upper arcuate seat and an inclined lower arcuate seat circumventing the passage. In another form, the seat is an annular portion of the internal annular wall which is engaged by the periphery of the disc. Two pairs of circumferentially spaced pivot projections provided for the pivoting of the disc about a cordial axis of the disc. Retaining means in the form of curved side ears or a center strut hold the disc in assembled relation with the base.

Summary of invention

The invention relates to a check valve having a valving member in the form of a disc which pivots to an open position and a closed position for controlling the direction of flow of a fluid through the valve. The disc is mounted for floating and pivotal movement in a valve base. The base has an inside circumferential wall forming a passageway through the valve. Retaining means secured to the base cooperate with the disc to hold the disc in assembled relation with the base. When the disc is in the closed position it engages a valve seat means.

In some of the widely used prosthetic heart valves, three significantly unphysiologic limitations persist. These are: (1) across the valve hemodynamic pressure gradient, (2) breakdown due to localized sites of wear and fatigue, and (3) large static and dynamic inertias of the flow regulating mechanism or valving member. Th ball type heart valve, as shown in U.S. Patent No. 3,099,016 to Edwards, incorporates wear durability with dependability. However, the significant pressure gradient found in most postoperative patients with a ball heart valve does not render the ball valve an ideal replacement. Also, the physical inability to implant sufficiently large ball valves in those patients with calcific aortic stenosis and those patients with small outflow annulus often results in an early postoperative death due to inadequate cardiac output. In such cases as these the abnormal pressure gradient and the reduced cardiac output contribute to the patient's demise.

Leaf or flaps heart valves, as shown in U.S. Patent No. 2,682,057 to Lord and U.S. Patent No. 2,832,078 to Williams, have minimal pressure gradients and satisfactory flow characteristics in the smaller sizes. However, as a replacement valve, the leaf valve has not been satisfactory due to failure secondary to localized areas of fatigue and wear.

Briefly described, the heart valve of this invention is a one-way fluid flow control unit having a base formed with a passage allowing fliud to flow through the valve. The base has seat means circumventing the passage which cooperates with disc means to block the flow of fluid in one direction through the passage. The disc means located within the passage pivots about a chordal axis toward and away from the seat means in response to pressure differences of the fluid on opposite sides of the disc means. The disc means is held in floating assembled relation with the base by retaining means which coact with peripheral edge portions of the disc means.

The pivoting disc heart valve incorporates the negligible wear feature of the ball valve and does so without the inherent high resistant or gradient usually found in the ball valve. With the disc located within the base passage, the entire valve has a relatively low profile. Mimicking the natural heart valve, the pivoting disc valve operates with unrestricted true central flow and without a temporary sinus thereby avoiding blood stagnation.

Figure 12:
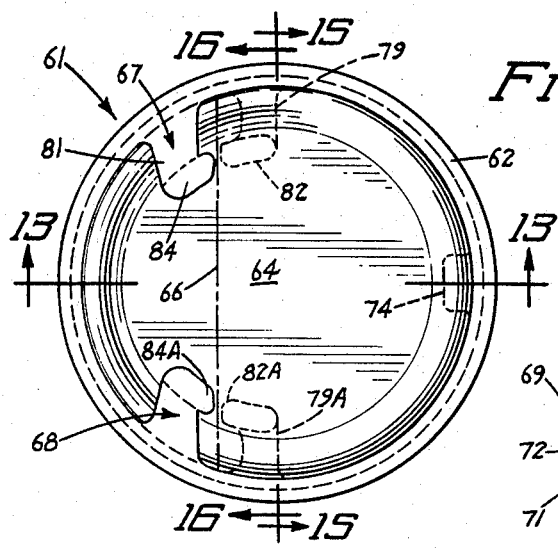
Figure 15:
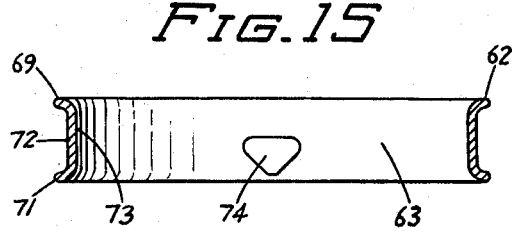
Figure 13:
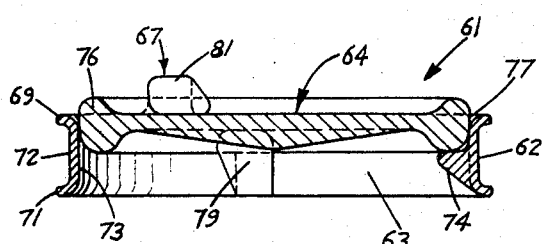
Figure 16:
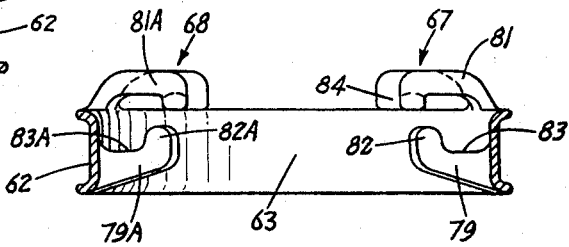
Figure 14:
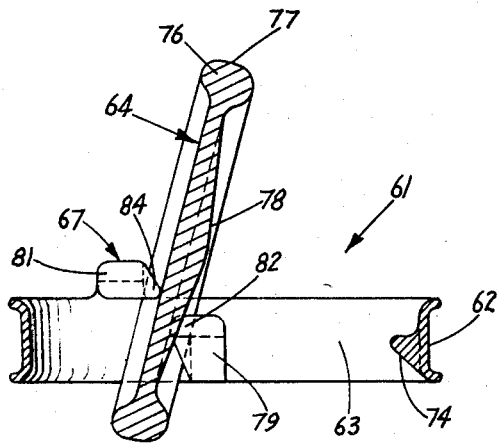

In the drawings:
FIGURE 1 is a plan view of the valve of this invention showing the valving disc closed;
FIGURE 2 is a sectional view taken along the line 2—2 of FIGURE 1 showing the open position and the closed position of the valving disc;
FIGURE 3 is a sectional view taken along the line 3—3 of FIGURE 1 with the valving disc omitted;
FIGURE 4 is a sectional view taken along the line 4—4 of FIGURE 1 with the valving disc omitted;
FIGURE 5 is a sectional view taken along the line 5—5 of FIGURE 1;
FIGURE 6 is a plan view of a modified valve of the invention;
FIGURE 7 is a sectional view taken along the line 7—7 of FIGURE 6;
FIGURE 8 is a sectional view taken along the line 8—8 of FIGURE 6 with the valving disc omitted;
FIGURE 9 is a sectional view taken along the line 9—9 of FIGURE 6 with the valving disc omitted;
FIGURE 10 is a sectional view similar to FIGURE 7 showing a further modification of the valve;
FIGURE 11 is a sectional view taken along the line 11—11 of FIGURE 10 with the valving disc omitted;
FIGURE 12 is a plan view of another modification of the valve of the invention;
FIGURE 13 is a sectional view taken along the line 13—13 of FIGURE 12;
FIGURE 14 is a sectional view similar to FIGURE 13 showing the valving disc in the open position;
FIGURE 15 is a sectional view taken along line 15—15 of FIGURE 12 with the valving disc omitted; and
FIGURE 16 is a sectional view taken along the line 16—16 of FIGURE 12 with the valving disc omitted.

Referring to the drawings, there is shown in FIGURE 1, the one-way valve of this invention indicated generally at 10 at approximately four times the size of the actual valve. Valve 10 has a base 11, shown as a ring or annulus, having a central passage 12 providing an opening for the flow of fluid, as a liquid, through the valve. Pivotally disposed within passage 12 of the base is a valving member or flat valve disc 13 which pivots about a pivot axis 14. Disc 13 is relatively thin and completely uniplanar. The disc pivot axis 14 is an imaginary chord lying equidistant between the center of the valve and the internal edge of the inner wall of the base.

A retaining means indicated generally at 16 projected upwardly from the distal side of the base holds disc 13 in an assembled and operative relation with respect to the base. Retaining means 16 is shaped in such a manner that when the disc 13 is in the closed position it uniformly engages the base and functions as a stop to limit pivot movement of the disc to the open position which is a position less than the vertical. Retaining means 16 also insures that the imaginary pivotal chord of valve disc 13 remains unaltered during the pivoting of the valve disc.

Base 11 has an external step annular groove 17 providing a scalloped external wall which forms a mounting retainer for a suture fixation collar (not shown). Encircling the inside circumferential wall of base 11 is an inclined interrupted valve disc seat consisting of a distal or top facing seat 18 and a proximal or bottom facing seat 19. Seats 18 and 19 are respectively two-thirds and one-third of the orifice circumferential length. Both seats project radially toward the central axis of the base to provide flat surfaces upon which arcuate peripheral portions of valve disc 13 rest when it is completely closed. The outer peripheral portion of the seat is slightly relieved to provide outflow streamlining and disc-elevation-freedom.

As shown in FIGURE 2, disc 13 is inclined from the horizontal plane of base 11, preferably about 18°. Seats 18 and 19 are located in planes which are parallel to each other and separated a distance equal exactly to the thickness of disc 13. Thus in the closed position, two-thirds of the disc's bottom peripheral edge engages distal seat 18 and one-third of the disc's top peripheral edge engages proximal seat 19. As shown in FIGURE 1, circumferential separations 21 and 22, between the two seats, are approximately equal to the thickness of the disc with the pivot chord axis 14 intersecting the valve base at the center of the separations 21 and 22. Also, the horizontal pivotal chord axis 14 is parallel to the spaced planes of the proximal and distal seats. Distal seat 18 terminates at its opposite ends into inwardly projected pivot projections 23 and 24 which constitute distal pivots for disc 13. In a similar manner the opposite ends of proximal seat 19 form abutments 26 and 27 which comprise proximal pivots for disc 13. When valve disc 13 opens, it pivots about the proximal pivots formed by abutments 26 and 27. Upon closing the circumferential edges of the disc contact with the sloping inside wall at the separations 21 and 22. The closing action is a very smooth uninhibited combination of a sliding motion on the inside wall of the base and pivoting motion about the distal pivots formed by projections 23 and 24.

Retaining means 16 comprise two lateral guide shields or ears 28 and 29 which function to control the movement of disc 13 as well as hold the disc in assembled relation with base 11. Shields 28 and 29 mounted on the distal side of base 11 project upwardly and curve inwardly to conform to the excursional arc of the circumference of disc 13. Shields 28 and 29 have a height approximately equivlaent to one-third of the diameter of disc 13 providing the valve with a relatively low profile. In the open position, disc 13, as shown in FIGURE 2, is restricted to a point of approximately three degrees off the vertical by the proximal and distal pivots comprising abutments 26 and 27 and pivot projections 23 and 24. Also in the open position, the horizontal diameter of the disc never rises above the top plane of the valve base 11.

Valve base 11 and lateral guide shields 28 and 29 are preferably made from a single piece of metal free of welds and joints. This piece can be fabricated by machining from a single unit of non-ferrous metal, as titanium, or an investment casting of a ferrous metal, as Stellite-21. Thermoplastics, as polypropylene, polycarbonate, CTEE fluorocarbons and acrylonitrile-butadiene-styrene (ABS) may be used to mold valve disc 13. The disc may be of metal having negligible wear characteristics, as titanium and Stellite-21.

In use, assuming valve disc 13 is in a closed position, the peripheral arcuate portions for the disc rest firmly on distal and proximal seats 18 and 19, an increase of pressure on the proximal side of disc 13 carries the disc away from the seats along an arcuate path. The fulcrums of abutments 26 and 27 guide the disc to pivot about the imaginary chord axis 14 until the disc is located in the full open position which is slightly less than vertical, as shown in FIGURE 2. This position is preferably three degrees from the vertical with the disc moving approximately seventy degrees from the closed position to the open position. The movement of liquid through passage 12 forces disc 13 to pivot to the full open position almost instantly. During the opening episode, disc 13 floats outwardly from base 11, as shown by broken lines in FIGURE 5, until the periphery of the disc engages the upper sections of the guide shields 28 and 29.

When disc 13 is in the open position it negligibly obstructs the outflow passage 12 by aligning itself in the streamline flow of the fluid. In the full open position, about 26% of the total flow passes through the smaller opening adjacent to the distal side of the disc while 74% of the total flow passes through the larger opening adjacent the proximal side of the disc. With fluid flowing on both sides of the disc there is a firm continuous washing of boht faces of the disc from the outflowing fluid as it traverses valve passage 12. Flat disc 13 does not produce eddy currents or pressure gradients across the valve as the disc permits unrestricted central flow of the fluid.

With valve disc 13 open it is inclined with respect to the vertical and rests against shields 28 and 29, abutments 26 and 27 and projections 23 and 24. To close the disc the proximal pressure decreases reversing the flow of fluid through passage 12 on both sides of the disc. The reverse flowing fluid forces the disc down into the valve base 11 until opposite portions of the disc along chordal axis 14 engage the inner surface of valve base 11 between separations 21 and 22. The two forces that combine the closing of the valve are the fluid rushing back through the passage 12 across the face of disc 13 which causes a drop in the hydrodynamic pressure of the proximal surface of the disc drawing the disc into the reduced pressure cavity and the esculating volume of fluid trapped behind the distal face of disc 13 in addition to the build-up in hydrodynamic pressure in this region forces the disc across the main return stream to rapidly return disc 13 to its closed positions on seats 18 and 19.

Referring to FIGURE 6, there is shown a modified one-way valve indicated generally at 31 having an annular base 32 formed with a passage 33 closed with a flat valve disc 34. Valve disc 34 angularly moves about a pivotal chord axis 36 to open and closed positions relative to the base to allow fluid to flow through passage 33 and block the reverse flow of fluid through the passage. Retaining means indicated generally at 37 secured to the top of base 32 and extended over passage 33 functions to maintain the disc in assembled relation with the base as well as provide a guide for the angular movement of disc 34. Retaining means 37 also insures that the imaginary pivotal chord axis of the valve remains unaltered during the floating and pivotal movement of disc 34.

Base 32, similar in construction to base 11, as shown in FIGURES 1 and 2, has a annular external groove 38 for accommodating a suture fixation collar (not shown). The inner annular wall of base 32 has a seat means for the valve disc comprising an arcuate distal or top seat 39 and a proximal or bottom seat 41. The opposite ends of seats 39 and 41 are separated from each other with seat 39 terminating in inwardly directed pivotal projections 42 and 43. Opposite ends of the bottom seat 41 terminate in abutments 44 and 46 which are spaced from and are located above the projections 42 and 43 respectively. The spaces 47 and 48 between the projections and abutments 42 and 44 and 43 and 46 respectively are equal to the thickness of disc 34. With disc 34 projected through spaces 47 and 48, the opposite extreme circumferential edge portions of the disc are in contact with the sloping inside wall of the base.

Retaining means 37 comprises an outwardly projected distal strut secured to the top of the base. As shown in FIGURE 7, the strut has a first arcuate segment 49 extended outwardly from the midportion of seat 39 to a point substantially above the pivotal axis 36. The outer end of first segment 49 is joined to a second downwardly and outwardly projected segment 51 secured to the opposite side of base 32. Located in the pinnacle of the strut is an upper stop 52 which is slanted at an angle of about three degrees with the vertical so as to limit the open position of the disc to no more than 87 degrees from the horizontal or three degrees from the vertical. In addition to stop 52, the maximum open position of disc 34 is determined by the offset orientation of the pivot projections 42 and 43 relative to their adjacent abutments 44 and 46.

Referring to FIGURES 10 and 11, there is shown a modification of valve 31 indicated generally at 53. The structural components of valve 53 which correspond to the components of valve 31 are indicated with the same reference numerals having the suffix A. In valve 53, the disc 34A pivots about a pair of spaced rods 54 and 56 which extend across one side of the passage 33A. These rods respectively replace the abutments 44 and 46 and pivot projections 42 and 43 used in valve 31. In addition to the distal strut, the retaining means 37A of valve 53 includes a proximal strut 57 projected downwardly and adjacent the midportion of the proximal seat 41A. Strut 57 has a first arcuate segment 58 joined to a second upright segment 59. The upper end of segment 59 is secured to the midportion of lower rod 56. Segment 59 serves as an additional stop in conjunction with a stop 52A to limit the open position of disc 34A as shown in broken lines in FIGURE 10.

The separated inclined seats of valves 31 and 53 are identical to the seats 18 and 19 of valve 10 shown in FIGURES 1 to 5. These seats are inclined preferably at eighteen degrees with respect to a normal plane projected through the axis of the passageway. The seats have flat arcuate portions upon which opposite peripheral surfaces of the disc contact when it is in the closed position. The outer peripheral portions of the seats are relieved slightly to provide outflow streamlining and disc-elevational-freedom. In addition to the shape of the seats, the base of the strut segment 49A is formed in a manner that when the disc closes it uniformly engages both proximal and distal seats. In valve 53, shown in FIGURE 10, the outer portion of arcuate segment 58 cooperates with the peripheral edge of disc 34A in conjunction with the lower portion of segment 49A to insure that disc 34A uniformly engages both proximal and distal seats as well as to insure that the disc pivots about the chordal axis which extends between the spaces between the separated seats.

Referring to FIGURE 12, there is shown another one-way valve of this invention, indicated generally at 61, having a base 62 with a valve passage 63. A valving member or disc 64 pivotally associated with the base angularly moves to open and closed positions, as shown in FIGURES 13 and 14, about a pivot axis 66. As shown in FIGURE 12, pivot axis 66 is an imaginary chord laterally spaced a substantial distance from the center of disc 64. Retaining means indicated generally at 67 and 68 cooperate with separate portions of disc 64 to hold the disc in assembled and floating relation with base 62 and also insures that the imaginary pivotal chord axis 66 of disc 64 remains unaltered during the opening and closing of the disc.

As shown in FIGURES 13 and 14, base 62 is an annulus or annular ring generally U-shaped in cross section. Base 62 has upper and lower outwardly directed flanges 69 and 71 forming an annular recess 72 to accommodate a suture retaining ring. The inner surface of base 62 has an inner upright annular wall 73 forming passage 63. Projected inwardly from wall 73 equal distance from retaining means 67 and 68 is a stop 74 which serves as a rest for disc 64 when it is in the closed position. As shown in FIGURE 13, disc 64 engages the top of stop 74 locating the disc within the upper part of base 62.

Disc 64 is a circular member having an enlarged peripheral bead 76 generally oval in cross section. The outer peripheral surface of bead 76 has a linear cylindrical portion 77. When disc 64 is in the closed position, as shown in FIGURE 13, cylindrical portion 77 is in light surface contact with an upper section of annular wall 73 thereby blocking the flow of liquid downwardly through valve passage 63. The upper surface of disc 64 is flat to the peripheral bead 76, while the bottom surface 78 of the disc 64 is convexed having a shape of a flat cone.

Retaining means 67 and 68 comprise two pairs of spaced pivot or fulcrum members which project inwardly toward each other along pivot axis 66. The pairs of pivot members are identical in structure and coact with separate portions of the disc during the pivoting of the disc. Each pair of pivot members includes a proximal pivot or leg 79 and a distal pivot or leg 81. Proximal pivot 79 terminates in an upwardly directed ear 82 having an end portion circumferentially extended toward the distal pivot. The top 83 of proximal pivot 79 is flat and lies in the same plane as the top of stop 74. Top 83 functions as a stop or rest for the disc 64. Distal pivot 81 terminates in an ear 84 having an end portion projected toward proximal pivot 79. Distal pivot 81 extends upwardly and inwardly from the top of base 62 and is circumferentially spaced outwardly from pivot axis 66. The corresponding parts of the pivot members comprise of retaining means 68, being identical to the opposite retaining means 67, are identified with like reference numbers having a suffix A.

With disc 64 in assembled relation with base 62, bead 76 is located between the proximal pivots and the distal pivots with ears 82 and 84 located adjacent to the inside surfaces of the bead so as to allow the disc to have rotational movement about its axis as well as pivotal movement about pivot axis 66.

As shown in FIGURE 14, disc 64 in the open position is located at an angle which is less than the vertical. This angle is determined by the terminal ends of ears 82 and 84 which engage portions of disc 64 on opposite sides of the axis 66 whereby the ears 82 and 84 function as stops preventing angular movement of the disc away from base 62.

In use with disc 64 in a closed position, as shown in FIGURE 13, an increase in pressure of the liquid on the proximal side of the disc will angularly pivot the disc to the open position about chordal axis 66, as shown in FIGURE 14. The liquid is free to flow through passage 63 on opposite sides of disc 64. Decreasing the pressure on the proximal side of the disc, the disc will quickly return to the closed position pivoting about axis 66. Disc 64 pivots on proximal pivots 79 and 79A until bead 76 rests on the upper surface of stop 74 and top surfaces 83 and 83A.

The embodiments of the invention in which an exclusive property or privilege is claimed are defined as follows:

1. A one-way heart valve for controlling the flow of fluid comprising: a base having an inside circular wall providing a passage and seat means extended around said inside wall, said seat means including a first seat portion and a second seat portion separated from the first seat portion, upper pivot means on the base adjacent the ends of the first seat portion, lower pivot means on the base spaced from the upper pivot means adjacent the ends of the second seat portion, disc means located between said upper pivot means and said lower pivot means for movement to an open position and a closed position, said disc means having an annular uninterrupted peripheral portion being free to rotate relative to the axial axis thereof and free to pivot on the pivot means between the open and closed positions, said disc means when in the closed position having a first portion engageable with the first seat portion and a second portion engageable with the second seat portion to block the flow of fluid in one direction through said passage, said disc means pivoting on the pivot means in a generally arcuate path away from both seat portions to the open position thereby allowing fluid to flow opposite said one direction through said passage, and retaining means for holding the disc means in assembled relation with the base.

2. The valve defined in claim 1 wherein the seat means is inclined with respect to a plane normal to the axis of the passage.

3. The valve defined in claim 1 wherein the first seat portion and second seat portion face in opposite directions and the disc means is a flat disc having a top peripheral surface engageable with the first seat portion and a bottom peripheral surface engageable with the second seat portion.

4. The valve defined in claim 3 wherein the disc pivots about an axis which coincides with a chord of the disc.

5. The valve defined in claim 4 wherein the first seat portion is about one-third of the circumferential length of the circular wall and the second seat portion is about two-thirds of the circumferential length of the circular wall.

6. The valve defined in claim 1 wherein the first seat portion is larger than the second seat portion and the disc pivots about an axis which coincides with a chord of the disc.

7. The valve defined in claim 1 wherein the retaining means comprise guide shields on opposite portions of the base, said shields project upwardly from the base and curve inwardly toward the passage.

8. The valve defined in claim 1 wherein the retaining means comprise a strut secured to the base and extended over said disc means.

9. The valve defined in claim 1 wherein the retaining means comprise a first strut secured to one side of the base and a second strut secured to the other side of the base.

10. The valve defined in claim 1 wherein the upper and lower pivot means comprise spaced rod means secured to said base and extended across said passage.

11. A one-way valve for controlling the flow of a fluid comprising: a base having an internal annular wall forming a passage through the base, disc means positionable in said passage for movement to an open position and a closed position, said disc means having an annular uninterrupted peripheral portion cooperating with said annular wall to substantially close said passage when the disc means is in the closed position, and pivot means secured to the base allowing pivotal movement of the disc means between the open position and the closed position about an axis which coincides with a chord of the disc means, said pivot means having a first pair of legs and a second pair of legs directed toward each other, each pair of legs having a first leg and a second leg spaced from each other to accommodate a peripheral portion of the disc means.

12. The valve defined in claim 11 wherein the pivot means are stops limiting the open position of the disc means to an inclined position with respect to the axis of the passage.

13. The valve defined in claim 11 wherein the disc means is a flat disc having an annular peripheral bead, said annular peripheral means being on the bead and engageable with annular peripheral portion of said wall when the disc means is in the closed position.

14. The valve defined in claim 11 wherein the base has at least one inwardly directed stop which is engaged by the disc means when the disc means is in the closed position.

15. The valve defined in claim 11 wherein the base is an annular ring generally U-shaped in cross section having inwardly directed stop means engageable by the disc means when the disc means is in the closed position, said stop means cooperationg with the lower legs to locate the disc means in the closed position.

16. The valve defined in claim 11 wherein the disc means has an enlarged peripheral bead and said upper legs have downwardly projected portions extended over the top of the bead and said lower legs have upwardly projected portions extended under the bead.

17. A one-way heart valve for controlling the flow of blood comprising: a base having an internal annular wall forming a passage through the base, pivot means secured to the wall of the base comprising a first pair of spaced pivot legs and a second pair of spaced pivot legs, aligned with and projected toward each other, each pair of pivot legs having a first leg and a second leg spaced from the first leg, a floating disc means positionable in said passage with parts of the peripheral portion of the disc means located between said first leg and second leg of the pairs of pivots for selective movement to an open position and to a closed position relative to the passage in the base, said disc means having an annular uninterrupted peripheral portion cooperating with said base to substantially close said passage when the disc means is in a closed position, and retaining means on the base to confine the disc means in floating assembled relation with respect to the base whereby the disc means is free to rotate relative to the axis thereof and free to pivot on the pivot means between the open position and the closed position.

18. The heart valve of claim 17 wherein: the retaining means comprise guide shields on opposite portions of the base, said shields projected upwardly from the base and curved inwardly toward the passage.

19. The heart valve defined in claim 17 wherein: the base has at least one inwardly directed stop spaced from the pivot means and engageable by the disc means when the disc means is in the closed position.

20. The heart valve of claim 17 wherein: the disc means is inclined with respect to the normal plane of the axis of the passage when in the closed position.

21. The heart valve of claim 17 wherein: the pivot means are located along a line which coincides with a chord of the disc means whereby the disc means pivots about an axis off-set from the center of the disc means.

References Cited

UNITED STATES PATENTS

| 718,657 | 1/1903 | Benton | 137—527 XR |
|---|---|---|---|
| 2,282,532 | 5/1942 | Shenk | 137—527.4 |
| 2,840,317 | 6/1958 | Kozak | 137—527.8 XR |
| 3,312,237 | 4/1967 | Mon | 137—525.1 XR |
| 3,367,364 | 2/1968 | Cruz | 137—527.8 |
| 3,374,489 | 3/1968 | Alvarez Diaz | 137—527 |

FOREIGN PATENTS 15,264    1910    Great Britain.

HAROLD W. WEAKLEY, Primary Examiner

U.S. Cl. X.R.

3—1